April 15, 1952   G. W. EDWARDS   2,593,278
CENTRIFUGE FOR SEPARATING A LIQUID FROM SOLID MATERIAL
Filed April 1, 1946
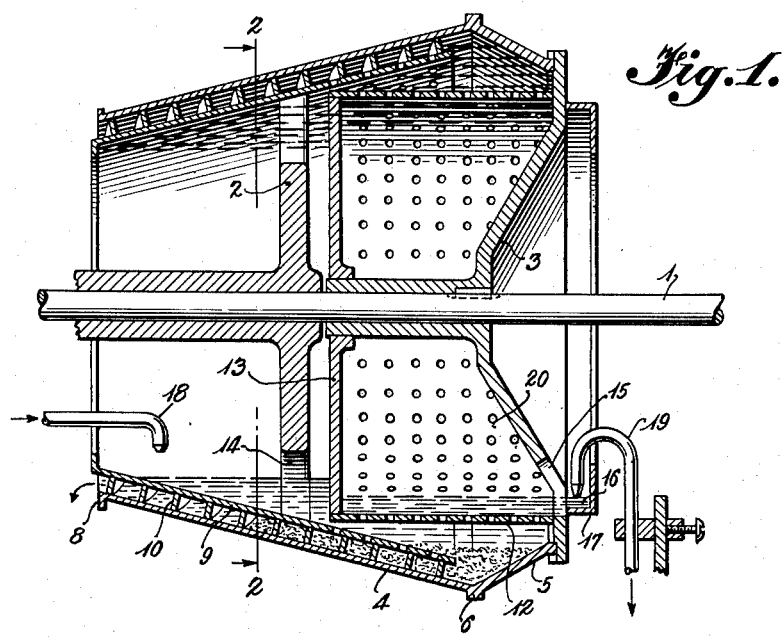
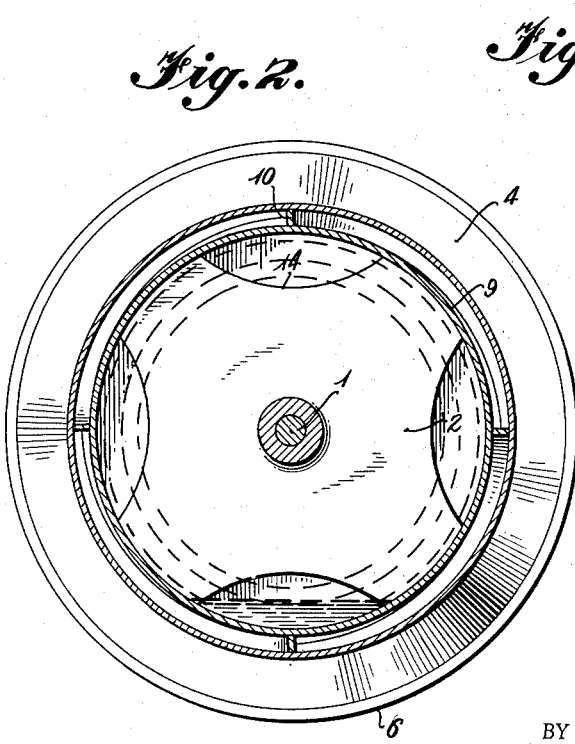
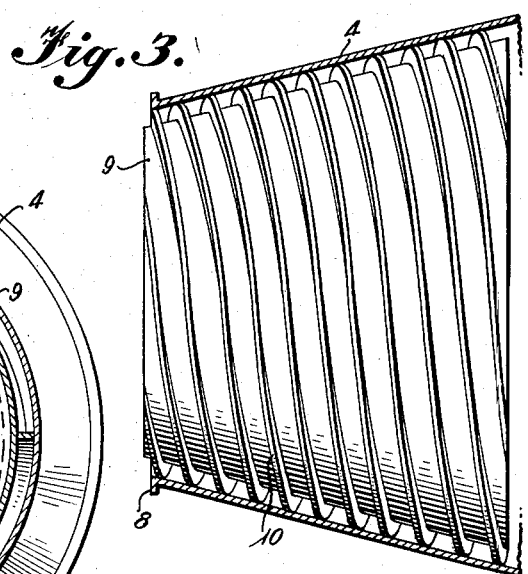
INVENTOR
George Wilfred Edwards
BY
ATTORNEYS Patented Apr. 15, 1952

2,593,278

UNITED STATES PATENT OFFICE 2,593,278

CENTRIFUGE FOR SEPARATING A LIQUID FROM SOLID MATERIAL

George Wilfrid Edwards, Mitry le Neuf, France, assignor to Société Anonyme Française pour la Séparation, l'Emulsion et le Mélange (procédés S. E. M.), Paris, France Application April 1, 1946, Serial No. 658,746
In France April 12, 1945

8 Claims. (Cl. 233—2)

My invention has for its object improvements in means for separating liquid from solid material through the simultaneous application of centrifugal decantation and filtration.

It has for its object in particular the following operations, to wit:

A preliminary settling.

A filtering of the roughly prepared liquid.

An automatic removal of silt from the filtering membrane.

An automatic removal of the solid material separated through settling and filtration.

An adjustment of the filtering pressure also called exhaust pressure.

These results are obtained in conformity with my invention by arranging inside a decantation vessel a filtering membrane or diaphragm located in a manner such that the liquid at the same time as it is separated through decantation or settling is urged through the membrane from outside towards the inside whereby the solid material which may have a tendency to be carried along by the liquid and to form silt on the filtering membrane is constantly rejected outwardly under the action of centrifugal force. At the same time the arrangement according to invention may include a device for extracting the solid material, said arrangement being constituted for instance by a worm or a scraper arranged coaxially with the settling vessel and progressing with a relative speed with reference to the latter. The settling or decantation vessel is preferably of a double cone shape so as to allow the accumulation under the best conditions of the solid material under the action of centrifugal force towards the line connecting the two cones at the point where the extractive device begins being operated.

Furthermore in accordance with my invention the filtered liquid is removed through sucking means or the like equivalent device arranged in an adjustable manner whereby it is possible to adjust the difference in pressure between the material exhaust level and the level of the filtered liquid in accordance with the requirements of filtration.

Further objects and characteristic features of my invention will appear in the reading of the following description corresponding to accompanying drawing given out by way of example and by no means in a limited sense, showing a particular form of execution of my invention, and wherein:

Fig. 1 is a central vertical section;

Fig. 2 is a vertical transverse section on line 2—2, of Fig. 1; and

Fig. 3 is a side elevation of a portion of Fig. 1 with the outer shell in section.

In said drawing, 1 designates a part of the shaft of the apparatus, said shaft rotating inside bearings not illustrated and controlled in any suitable manner by means of arrangements which are not either illustrated.

This shaft is rigid with the frame 3 of the settling vessel, which latter is constituted by two conical members 4 and 5 meeting along a circular line 6, corresponding to the maximum diameter of the vessel. 8 designates the sill over which the solid material is removed as disclosed hereinafter. Inside the part 4 of the vessel is arranged an extracting apparatus constituted by a conical surface 9 carrying a conveyor 10.

The conical surface 9 is carried by a frame 2, independent from frame 3, and freely rotating on shaft 1; the said frame 2 being driven by driving means not shown, at a rotative speed differing from that of frame 3 and drum 4—5. The conveyor 10 is constituted by an helicoidal worm carried by surface 9 and surrounding same on its whole length, the outer edge of said helicoidal worm scraping the internal surface of drum 4, when drum 4 and surface 9 rotate at different speeds. The conical surface 9 is furthermore perforated at 11 in the vicinity of its widest cross-section so as to allow the solid material produced by the settling or filtration to reach the zone swept by the extracting device.

The filtering membrane 12 of cylindrical shape is located as apparent on the figure in front of the conical member 5 of the vessel and of the flaring portion of the cone 4. A wall 13 cooperates with said membrane so as to form a filtering chamber 20. Perforations 14 are provided in the portion 2 of the frame for allowing the introduction of liquid inside the bottom of the vessel while other perforations 15 are provided in the portion 3 of the frame for ensuring a communication between the filtering chamber proper inside the cylindrical surface 12 and the chamber 16 defined by a diaphragm 17 on the outside of the filtering chamber. 18 designates the means for introducing the liquids to be treated and 19 the syphon through which the decanted and filtered liquid is removed through suction.

The position of this suction or syphon means is adjustable as disclosed hereinabove so that it is possible to modify the liquid level inside the filtering chamber.

The apparatus as described operates as follows:

The apparatus being caused to rotate, the liquid is introduced through 18 inside the cone 4; it flows out through the perforations 14 and fills the vessel up to the level of the sill 8. There is then produced on the filtering membrane 12 a pressure proportional to the difference in level $h3—h2$ of the liquid in the filtering chamber and in front of the sill 8. It should be noticed that $h3$ and $h2$ depend on the centrifugal force applied.

When the amount of deposit accumulated inside the settling vessel, more particularly in the vicinity of the point 6, is sufficient, said deposit is forced in a continuous manner by the worm 10 towards its exhaust through the sill 8. The pressure exerted by the liquid corresponding to the level $h1$ is all the greater when the solid material opposes a higher resistance to the exhaust. But as this pressure acts directly on the material for furthering its removal, it is apparent that said removal is adjusted in a substantially automatic manner.

Obviously many modifications may be brought to the arrangement disclosed without widening the scope of my invention which should not be construed merely with reference to the single form of execution illustrated and is defined in accompanying claims.

What I claim is:

1. A device for separating liquid from solid material comprising a centrifugal bowl rotatably mounted around an axis, means for introducing solid carrying liquid material inside said bowl, a rotary filtering membrane located inside said bowl having substantially the shape of a surface of revolution around the axis of said bowl, and extending through a substantial length in the direction of said axis, at least a substantial part of the surface of said rotary filtering membrane having a radius greater than the inner radius of the liquid annulus to be formed centrifugally inside said bowl, means cooperating with said rotary filtering membrane for defining a chamber communicating with the remainder of the bowl, as regards the liquid to be treated, only through the pores of the filtering membrane and means for removing the solid free liquid from said chamber on the inside of said rotary filtering membrane.

2. A device for separating liquid from solid material comprising a centrifugal bowl rotatably mounted around an axis, means for introducing solid carrying liquid material inside said bowl, a rotary filtering membrane located inside said bowl having substantially the shape of a surface of revolution around the axis of said bowl, and extending through a substantial length in the direction of said axis, at least a substantial part of the surface of said rotary filtering membrane having a radius greater than the inner radius of the liquid annulus to be formed centrifugally inside said bowl, means cooperating with said rotary filtering membrane for defining a chamber communicating with the remainder of the bowl, as regards the liquid to be treated, only through the pores of the filtering membrane and adjustable means for removing the solid free liquid from said chamber on the inside of said rotary filtering membrane.

3. A centrifugal machine for continuous separation of a liquid from solid material carried along by it, comprising a rotary shaft, an at least partly frustoconical rotary bowl carried thereby, means for introducing solid carrying liquid material into one end of the bowl, a rotary filtering membrane of substantially cylindrical shape, coaxial with said bowl, and the radius of which is larger than the distance between the input of the liquid, and the axis of the bowl, and also than the radius of the liquid annulus centrifugally formed in the bowl, means for removing the solid centrifuged particles from the part of the bowl lying in register with the filtering membrane, on the outside thereof, means cooperating with said filtering membrane for defining a chamber communicating with the remainder of the bowl, as regards the liquid to be treated, only through the pores of the filtering membrane, and means for removing the solid free liquid from said chamber.

4. A centrifugal machine for continuous separation of a liquid from solid material carried along by it, comprising a rotary shaft, an at least partly frustoconical rotary bowl carried thereby, means for introducing solid carrying liquid material into one end of the bowl, a filtering membrane of substantially cylindrical shape, the radius of which is larger than the distance between the input of the liquid, and the axis of the bowl, and also than the radius of the liquid annulus centrifugally formed in the bowl, means for removing the solid centrifuged particles from the part of the bowl lying in register with the filtering membrane on the outside thereof, means cooperating with said filtering membrane for defining a chamber communicating with the remainder of the bowl, as regards the liquid to be treated, only through the pores of the filtering membrane, and means for removing the solid free liquid from said chamber at an adjustable distance from the axis of the bowl.

5. A centrifugal machine for continuous separation of a liquid from solid material carried along by it comprising a rotary shaft, an at least partly frustoconical bowl carried thereby, means for introducing solid carrying liquid material into one end of the bowl, a rotary filtering membrane of substantially cylindrical shape, the radius of which is larger than the distance between the input of the liquid, and the axis of the bowl, and also than the radius of the liquid annulus centrifugally formed in the bowl, a conveyor adapted to scrapingly engage the surface of the frusto-conical part of the bowl and to convey the solid material urged centrifugally against the larger part of said frustocone towards the smaller end thereof, means for removing the solid centrifuged particles from the part of the bowl lying in register with said end, means cooperating with said filtering membrane for defining a chamber communicating with the remainder of the bowl, as regards the liquid to be treated, only through the pores of the filtering membrane, and means for removing the solid free liquid from said chamber.

6. A centrifugal machine for continuous separation of a liquid from solid material carried along by it comprising a rotary shaft, an at least partly frusto-conical rotary bowl carried thereby, means for introducing solid carrying liquid material into one end of the bowl, a rotary filtering membrane of substantially cylindrical shape coaxial with said bowl, and the radius of which is larger than the distance between the input of the liquid, and the axis of the bowl, and also than the radius of the liquid annulus centrifugally formed in the bowl, a frusto-conical rotary drum coaxial with, and substantially parallel to the frusto-conical part of the bowl on the inside of the latter, means for rotating the bowl and the drum at different speeds of rotation, a worm conveyor mounted rigidly on the outer wall of the drum, and adapted to scrapingly engage the surface of the frusto-conical part of the bowl and to convey the solid material urged centrifugally against the larger part of said frustocone towards the smaller end thereof, means for removing the solid centrifuged particles from the part of the bowl lying in register with said end, means cooperating with said filtering membrane for defining a chamber communicating with the remainder of the bowl, as regards the liquid to be treated, only through the pores of the filtering membrane, and means for removing the solid free liquid from said chamber.

7. A centrifugal machine for continuous separation of a liquid from solid material carried along by it, comprising a rotary shaft, an at least partly frusto-conical rotary bowl carried thereby, means for introducing solid carrying liquid material into one end of the bowl, a filtering membrane of substantially cylindrical shape, the radius of which is larger than the distance between the input of the liquid and the axis of the bowl, and also than the radius of the liquid annulus centrifugally formed in the bowl, a frusto-conical rotary drum coaxial with and substantially parallel to the frusto-conical part of the bowl on the outside of the latter, perforations in the larger part of said drum, means for rotating the bowl and the drum at different speeds of rotation, a worm conveyor mounted rigidly on the outer wall of the drum, and adapted to scrapingly engage the surface of the frusto-conical part of the bowl and to convey the solid material urged centrifugally against the larger part of said frustocone towards the smaller end thereof, means for removing the solid centrifuged particles from the part of the bowl lying in register with said end, means cooperating with said filtering membrane for defining a chamber communicating with the remainder of the bowl, as regards the liquid to be treated, only through the pores of the filtering membrane, and means for removing the solid free liquid from said chamber at an adjustable distance from the axis of the bowl.

8. A centrifugal machine for continuous separation of a liquid from solid material carried along by it comprising a rotary shaft, an at least partly frusto-conical rotary bowl carried thereby, means for introducing solid carrying liquid material into one end of the bowl, a filtering membrane of substantially cylindrical shape, the radius of which is larger than the distance between the input of the liquid, and the axis of the bowl, and also than the radius of the liquid annulus centrifugally formed in the bowl, a frusto-conical rotary drum coaxial with, and substantially parallel to the frusto-conical part of the bowl on the inside of the latter, perforations in the larger part of said drum; means for rotating the bowl and the drum at different speeds of rotation, a worm conveyor mounted rigidly on the outer wall of the drum, and adapted to scrapingly engage the surface of the frusto-conical part of the bowl and to convey the solid material urged centrifugally against the larger part of said frustocone towards the smaller end thereof, means for removing the solid centrifuged particles from the part of the bowl lying in register with said end, means cooperating with said filtering membrane for defining a chamber communicating with the remainder of the bowl, as regards the liquid to be treated, only through the pores of the filtering membrane, and means for removing the solid free liquid from said chamber, at the end of the bowl opposite to the end through which the solid carrying lying material has been introduced.

GEORGE WILFRID EDWARDS.

REFERENCES CITED

The following references are of record in the file of this patent:

UNITED STATES PATENTS

| Number | Name | Date |
|---|---|---|
| 499,347 | Peck | June 13, 1893 |
| 499,348 | Peck | June 13, 1893 |
| 1,124,907 | Jahn | Jan. 12, 1915 |
| 2,054,058 | Laughlin | Sept. 8, 1936 |
| 2,056,888 | Pecker | Oct. 6, 1936 |
| 2,184,598 | Jahn | Dec. 26, 1939 |
| 2,220,925 | Walker | Nov. 12, 1940 |
| 2,308,559 | Winkler | Jan. 19, 1943 |

FOREIGN PATENTS

| Number | Country | Date |
|---|---|---|
| 632,252 | Germany | July 4, 1936 |
| 118,826 | Australia | Aug. 31, 1944 |